Nov. 15, 1949     H. FRIEDMAN ET AL     2,487,797
DETECTION OF WATER IN FUELS

Filed Dec. 10, 1946     2 Sheets—Sheet 1

Inventors
HERBERT FRIEDMAN
WILLIAM A. ZISMAN
MILES V. SULLIVAN

By

Attorney

Nov. 15, 1949  H. FRIEDMAN ET AL  2,487,797
DETECTION OF WATER IN FUELS
Filed Dec. 10, 1946  2 Sheets-Sheet 2
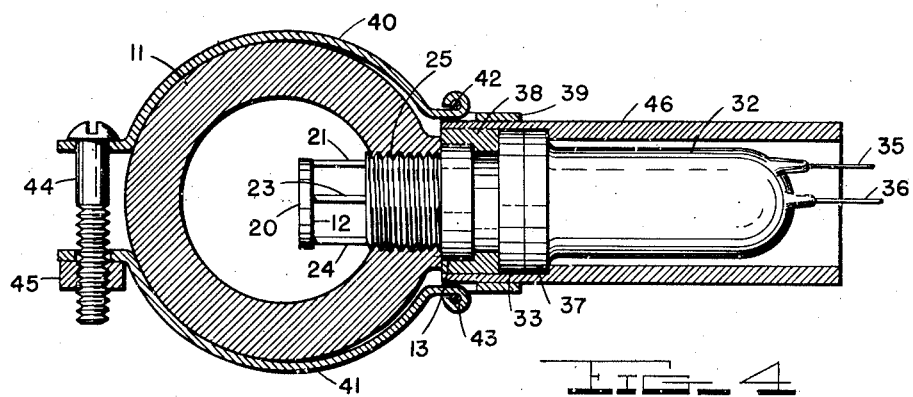
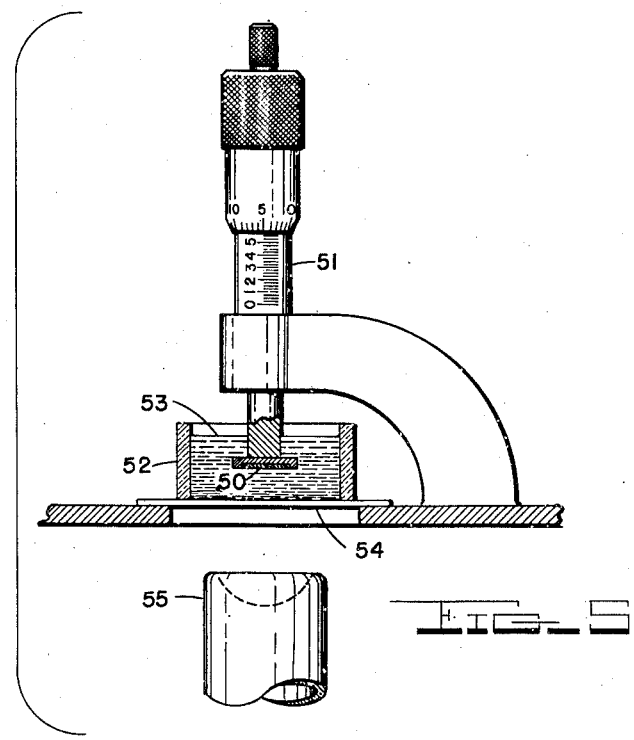
Inventors
HERBERT FRIEDMAN
WILLIAM A. ZISMAN
MILES V. SULLIVAN
By M. O. Hayes
Attorney Patented Nov. 15, 1949

2,487,797

UNITED STATES PATENT OFFICE 2,487,797

DETECTION OF WATER IN FUELS

Herbert Friedman, Arlington, Va., William A. Zisman, Washington, D. C., and Miles V. Sullivan, Briant Parkway, Summit, N. J.

Application December 10, 1946, Serial No. 715,235

7 Claims. (Cl. 250—83.6)

(Granted under the act of March 3, 1883, as amended April 30, 1928; 370 O. G. 757)

The invention described herein may be manufactured and used by or for the Government of the United States of America for governmental purposes without the payment of any royalties.

This invention relates to analytical control devices employing radiant energy for fluid flow systems and has particular reference to a device for the early detection of the presence of foreign matter in a fluid and the estimation of the quantity of foreign matter in the fluid.

An object of the present invention is to provide a device for the early detection of the presence of undesirable foreign matter in a fluid system.

Another object of the invention is to provide a convenient method and simple device for early detection of contamination of fluid in a pipe line.

Still another object of the present invention is to provide a device for continuously quantitatively analyzing for a particular chemical component in a fluid medium flowing through a system.

Still further objects of the invention reside in the details of construction and combination of devices comprising the embodiments shown herewith and will in part be obvious and in part appear hereinafter.

A common problem in many industrial installations is the control of fluid materials to keep them free of impurities which they may have acquired during storage and handling. For example, the gasoline used in aircraft and automotive equipment and marine fuel oils are highly susceptible to contamination through the inclusion of water in the system. In shipboard installations the problem of possible use of contaminated fuel is particularly great, since during a voyage, empty fuel tanks may be filled with sea water to ballast the ship properly. Pumping means are inadequate for removing the water entirely when refilling a tank with fuel is necessary, in consequence of which water collects and settles at the bottom of the tank. Aboard aircraft the possible induction of water into the gasoline lines is an ever-present hazard, since relatively small amounts of water may result in engine failure.

In order to guard against water contamination in fuels, therefore, a device which automatically and quickly detects amounts of this component above a certain very low minimum, combined with a warning and control mechanism for notifying the personnel involved and, if desired, for automatically shutting off the flow of contaminated fuel to the engines is highly desirable.

Our invention comprises an apparatus and method of detecting foreign matter such as water in a fluid flow line, in which apparatus a standard source of beta radiation is located within the flow stream of the fluid and oriented to pass its radiations through a path of fixed length in the fluid to the exterior of the fuel line.

A detecting device, comprising a Geiger-Mueller counter and measuring circuits, is located to receive the beta radiations and the device is adjusted for a quiescent state in which uncontaminated fluid does not produce any response in the warning circuit. When the effective length of the beta radiation path is changed, however, by the interposition of an impurity, such as water, having a different radiation absorption capacity than the fluid itself, the radiation intensity felt by the Geiger-Mueller counter decreases to such an extent that the electrical circuits operatively connected therewith are activated from their quiescent state to produce a warning or operate valves to shut off the flow of fluid through the line.

The method of detecting the presence of foreign matter in fluids includes the combination of steps involved in passing beta radiation through a path of fixed length in a fluid and detecting a change in intensity of received radiation thereby to obtain an indication of the first appearance of foreign matter in the fluid. The method is particularly advantageous in that its threshold sensitivity is very low, far below that of conductivity and similar conventional detecting devices. The value of early detection of foreign matter is clear for it leaves ample time to correct the condition before damage is done.

For a better understanding of the method and apparatus comprising the present invention, reference may be had to the accompanying drawings wherein:

Figure 4 is a cross-sectional drawing of a typical embodiment of the complete device installed in a pipeline;

Figure 5 is a cross-sectional drawing of an experimental apparatus used in testing this invention and determining optimum adjustments for a given fluid.

Figure 1:
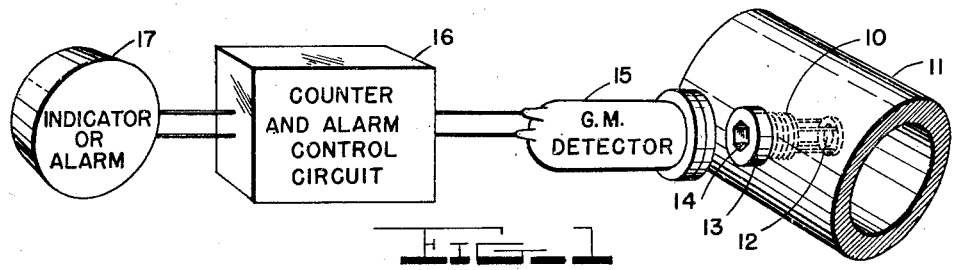
Figure 1 is a block diagram showing the relationship of the parts of the apparatus.

The apparatus, as shown in Figure 1, comprises a removable plug fitting 10 which is installed in a pipeline 11. Radiation from a beta ray source 12 passes through a section of the fluid, and through the hollow plug 13, central insert disk 14 of which is composed of a radiation permeable material such as beryllium or aluminum. The beta rays transmitted through the fluid and plug are then detected by a Geiger-Mueller counter tube 15 and the pulses produced by the tube are counted by an electronic counter and alarm control circuit 16 which gives a visual or auditory response on an indicator 17, or operates controls to stop the fluid flow.

Figure 2:
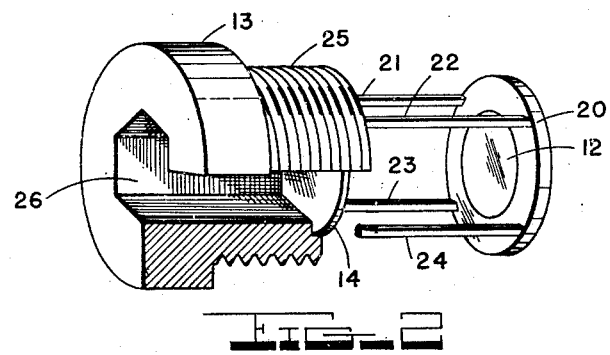
Figure 2 is a drawing of one embodiment of a part of the invention showing the beta ray source and mount therefor.

Figure 2 shows the beta ray source and mounting which is placed in the fuel line. Disk 20 is located with a small amount, e. g. a few micrograms, of a radioactive material 12 which gives an output rich in beta rays. This source is held in position, with respect to the plug, by means of braces 21, 22, 23 and 24 which fix the length of the radiation path in the fluid. The plug assembly is comprised of four parts, a hollow threaded portion 25, which is designed to fit the tapped opening in the fuel line, a flanged portion 13, a keyed portion 26, which is constructed so as to allow the use of a tool for removal and replacement of the entire assembly in a pipe line, and a radiation permeable disk 14 sealed in place against threaded portion 25. The flange 13 and threaded section 25 may be constructed of metal relatively impermeable to beta radiations. The thickness of the insert disk 14 will be dependent on the pressure of the liquid in the pipe line, and will be as thin as is consistent with the physical properties of the insert and the strength of the beta radiation source.

Figure 3:
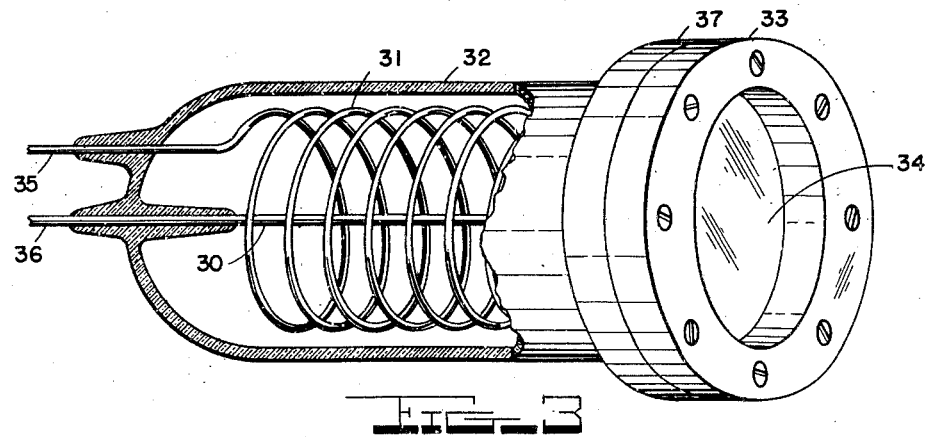
Figure 3 is a drawing of a preferred form of Geiger-Mueller counter for use as the detector in this equipment.

Figure 3 illustrates a preferred form of Geiger-Mueller counter tube for use in this apparatus. The counter is described more fully in the United States patent application Serial Number 652,200, filed March 5, 1946, by Herbert Friedman, now Patent No. 2,475,603. This form of counter tube comprises a central anode 30 around which a cathode 31 consisting of an open helix, is supported. These elements are hermetically sealed, together with an inert gas and an organic quenching vapor, in the container 32, which is provided with fittings 33 and 37, between which are clamped a beta ray permeable window of beryllium or aluminum 34. Leads 35 and 36 are provided for external electrical connections to the tube elements. This tube has a maximum sensitivity to beta rays and is relatively insensitive to gamma rays and other radiation.

One method of installing the beta radiation source and detector in a fuel line is shown in some detail in Fig. 4. Into the fuel line 11 is inserted a plug comprising a source of beta rays 12 mounted on frame 20 and supported in position by braces 21, 22, 23 and 24, as shown in Fig. 2. Threaded portion 25 is inserted in the fuel line so that the flange 13 fits tightly against the fuel line. The radiation permeable insert disk permits the passage of beta radiations. The Geiger-Mueller counter tube 32 is mounted in container 46, so that the flange 33 is fitted against an annular ring 38 and is thereby held in a spaced relationship to the radiation permeable plug insert. Leads 35 and 36 connect the Geiger-Mueller detector tube 32 to a counting circuit. The entire counter tube assembly may be affixed to the fuel line by the arrangement shown in this figure, wherein holding bands 40 and 41 are pivoted on pins 42 and 43 respectively. The bands are held in place by screw 44 which can be threaded through the bands and tightened against nut 45. This arrangement provides a means whereby the counter tube assembly may be assembled and dissembled readily. In this diagram the fuel line has been exaggerated in thickness to demonstrate the inter-relationship of the parts.

The beta radiation source 12 is preferably a small amount of a radium compound, and it may be present in any one of several forms. A quantity of impure radium chloride, bromide, or sulfate, containing the equivalent of about ten micrograms of the pure salt, may be mixed with a vehicle such as a clear lacquer and painted on the backing plate 20. For protection against the erosion of the fluid, the radioactive source may be covered by a thin layer of one to two thousandths of an inch thickness of dural or aluminum foil, which will protect the radioactive material and still permit passage of the radiations.

A further method of providing a radioactive source is to incorporate a small quantity of a radioactive material into a metal such as gold, silver or platinum by sintering. A small portion of this material may be impressed into the surface of the plate 29 and covered or electroplated with a protective coating comprising a thin film of dural, aluminum, beryllium or gold.

The output of the Geiger-Mueller counter tube will consist of a series of pulses which are produced by the ionizing action of the beta rays upon the gas filling of the tube. The number of these pulses per unit time will depend upon the intensity of beta radiation reaching the tube, and this factor depends, in the apparatus, largely upon the absorption of the radiation by the layer of fluid interposed between the source of radiation and the radiation permeable plug. Water has a strong absorptive effect on beta radiations so that a relatively small percentage dispersed in a hydrocarbon medium will materially decrease the intensity of radiations reaching the detector. It is to be noted that an optimum spacing of the radiation source can be found since a certain critical distance exists for each combination of source, detector and fluid at which the greatest ratio of absorption between fluid and water is obtained.

Tests were conducted using the apparatus shown in Figure 5 to determine the optimum thickness of the fluid layer which should be subjected to the measurement. In this figure the apparatus comprised a radiation source for beta rays 50, which was suspended by a micrometer adjustment 51 in a container 52 of the fluid 53 to be tested. The bottom 54 of the containing vessel was constructed of a radiation permeable material such as beryllium. A Geiger-Mueller counter tube of the type constructed using a radiation permeable window and sensitive to beta rays was employed as detector. A series of tests was run using first the fluid to be controlled and then the foreign matter to be detected in the sample vessel, and the average number of counts per second were recorded at varying distances of the radiation button from the bottom of the sample vessel. In one specific instance gasoline and water were used. From the values obtained ratios were computed by dividing the number of counts per second with the fluid alone by the number of counts per second with the foreign matter at varying distances. With gasoline and water these ratios were found to reach a maximum of about 1.6 when the sample thickness was about 0.3 inch. The optimum distance, however, for any apparatus will vary with the nature of the particular apparatus and with the fluids used. It is to be further noted that a thin layer of sample may be used because beta rays are a relatively weak form of radiation and do not permeate thick layers of materials easily. Were gamma rays or X-rays to be used as the radiation in this apparatus, a much longer path of radiation in the fluid would be required and a device for providing the radiation source would be of a very impractical form because of undue size requirements, but would give ratios of 1000 to 1 (for X-rays in contrast to the 1.6 to 1 obtained with beta rays) in the counting rate for distances of about 10 cm. and may be considered where high accuracy is desired.

The output of the Geiger-Mueller counter tube, in the embodiment shown in Figure 4, may be applied to a counting circuit so adjusted that a marked decrease in the number of pulses, corresponding to an increased absorption due to contaminants such as water in the fuel line, produces a warning signal or shuts off the flow of fluid in the line.

The method and apparatus described herein is capable of modification, in that the fluid and contaminant concerned may be of any types having different beta ray absorptivities. Calibration of the apparatus may be devised in which the output of the counter gives a continuous indication of the relative concentration of a given component of the medium.

A system of a plurality of units, each comprising a beta ray source, permeable plug and Geiger-Mueller counter tube, may be set up, single units at strategic points of a pipeline or other liquid-carrying system. By interconnecting these units and centrally locating an indicating, recording and controlling device, an automatic alarm system, or an automatic control system to shut off flow in a contaminated portion of a unit may be evolved.

Such a system would permit the detection of leakage into a pipeline of fluid flow line, or a change of conditions therein. Thus, leakage of water into a gasoline line could be made evident, the fuel flow stopped, and the location of the leak found before ordinary means would indicate any leakage.

It will be apparent to one skilled in the art that this invention is by no means limited to the particular organization of parts or sequence of steps shown and described, but that many modifications may be made without departing from the scope of the invention as set forth in the appended claims.

What is claimed is:

1. A method for detecting, in a fluid medium, the occurrence of a foreign component having a different radiation absorbing capacity than said medium comprising, continually transmitting beta rays through a fixed distance in said medium and detecting any change in the total radiation absorption capacity of the medium by detecting a change in the intensity of the transmitted radiation.

2. In apparatus for detecting in a fluid medium, the occurrence of a foreign component having a radiation absorption capacity different than that of said medium, the combination of a constant source of beta radiation, means for disposing said source in the interior of said fluid to transmit said radiation through a fixed thickness of said fluid, a beta radiation permeable plug disposed in the wall of the fluid container in the path of said radiation, with means for constantly detecting the intensity of said transmitted radiation comprising a Geiger-Mueller counter selectively sensitive to said beta radiation.

3. An apparatus for the quantitative determination of water in a fuel line comprising a source of beta rays located in the fuel line in a fixed position to pass the beta rays through a fixed thickness of fuel, means comprising a beta radiation permeable plug in the fuel line to pass beta radiation to an external detector, and detecting means comprising a Geiger-Mueller counter selectively sensitive to beta radiation and rigidly supported with respect to the fuel line to maintain a fixed spaced relationship between said detector tube and said radiation permeable plug.

4. An apparatus for detecting, in a fluid medium, the occurrence of small quantities of a foreign component having a radiation absorption capacity different from that of said medium, comprising, a source of beta radiation, means for disposing said source to transmit said radiation through a fixed distance in said fluid said fixed distance being that through which the ratio of total radiation absorbed by the foreign component to that absorbed by the pure fluid medium is a maximum, a beta radiation permeable plug disposed in the wall of the fluid container in the path of said radiation, and means for constantly detecting the intensity of said transmitted radiation.

5. An apparatus for detecting the occurrence of small quantities of water in gasoline comprising, a source of beta radiation, means for disposing said source to transmit said radiation through a fixed distance in said gasoline said fixed distance being that through which the ratio of total radiation absorbed by water to that absorbed by gasoline is a maximum, a beta radiation permeable plug disposed in the wall of the fluid container in the path of said radiation, and means for constantly detecting the intensity of said transmitted radiation.

6. In the calibration of apparatus for detecting the presence of a foreign component in a fluid medium comprising a source of beta radiation disposed to transmit radiation through said medium and means for constantly detecting said transmitted radiation, the method comprising, adjusting the position of said source of beta radiation to vary the distance through which the radiation is transmitted until the ratio of radiation transmitted through the fluid medium to that transmitted through an equal distance in the foreign component is a maximum.

7. In the calibration of apparatus for detecting the presence of a foreign component in a fluid medium comprising a source of beta radiation disposed to transmit radiation through said medium and means for constantly detecting said transmitted radiation, the method comprising, transmitting radiation from said source through several discrete thicknesses of the fluid medium to the said detecting means to determine the intensity of the therethrough transmitted radiation as a function of thickness of said fluid, transmitting radiation from said source through several discrete thicknesses of said foreign component to the said detecting means to determine the intensity of the therethrough transmitted radiation as a function of thickness of the foreign component, and finally disposing the source to transmit radiation through a distance equal to the thickness at which the ratio of intensity of radiation transmitted through the pure fluid medium to that of radiation transmitted through the foreign component is a maximum.

HERBERT FRIEDMAN.
    WILLIAM A. ZISMAN.
    MILES V. SULLIVAN.

REFERENCES CITED

The following references are of record in the file of this patent:

UNITED STATES PATENTS

| Number | Name | Date |
|---|---|---|
| 1,808,709 | Blake | June 2, 1931 |
| 2,264,725 | Shoupp et al. | Dec. 2, 1941 |
| 2,316,239 | Hare | Apr. 13, 1943 |
| 2,346,043 | Mysels | Apr. 4, 1944 |
| 2,368,486 | Mullane | Jan. 30, 1945 |